Figure 1:
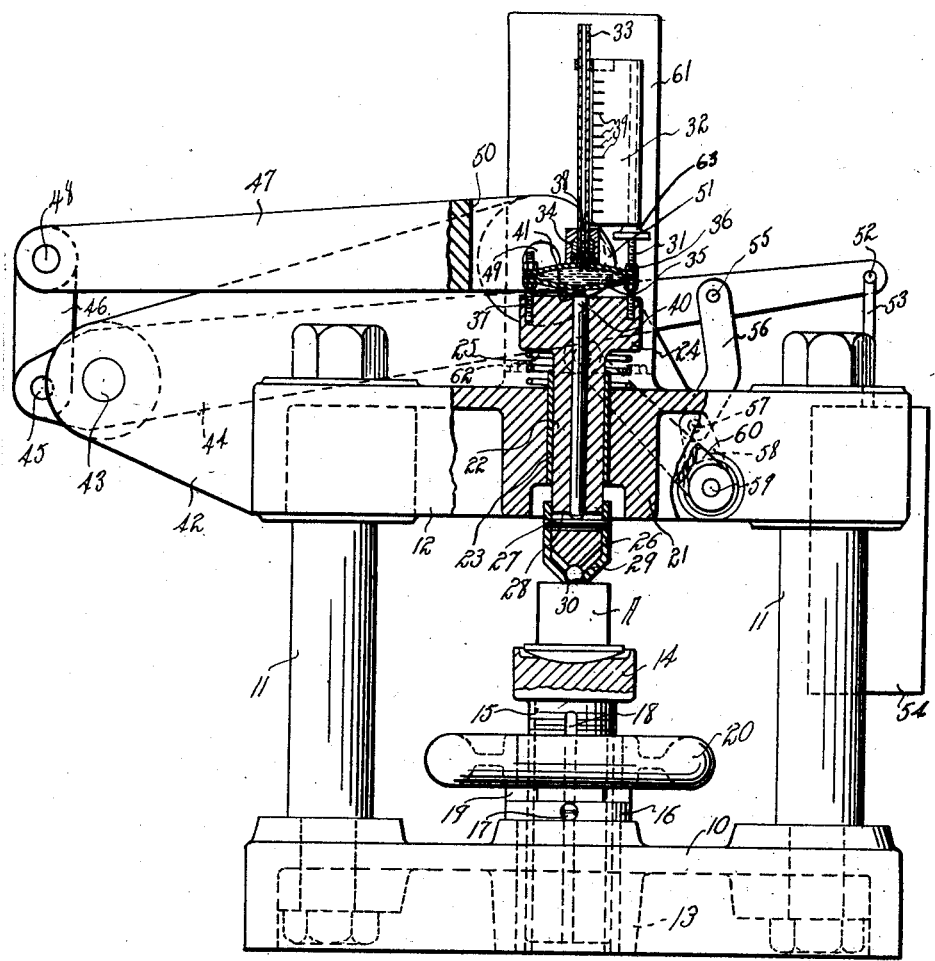

April 1, 1930.　　　M. N. PRANGE　　　1,752,964
MEASURING DEVICE
Filed Sept. 28, 1925　　　2 Sheets-Sheet 1

Inventor
Maurice N. Prange
By Whittemore Hulbert Whittemore
+ Belknap　Attorneys

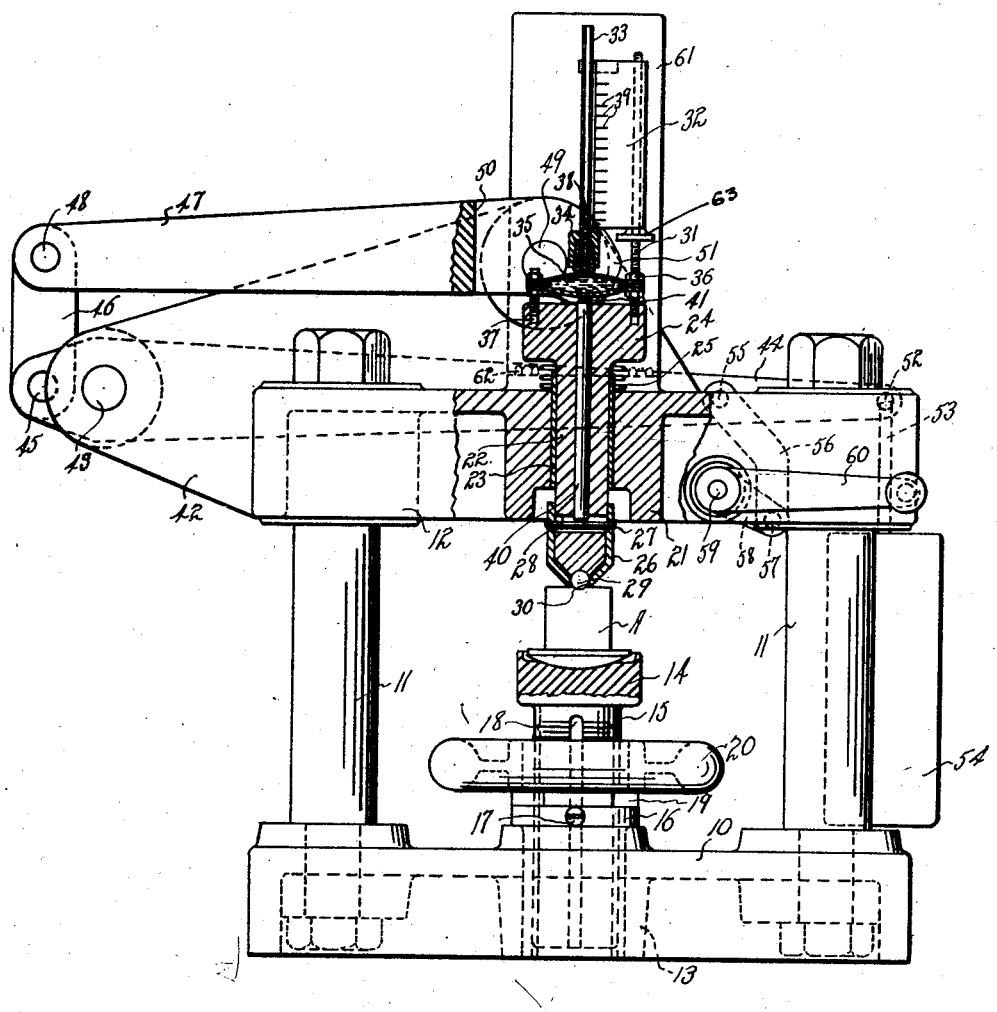

Patented Apr. 1, 1930

1,752,964

UNITED STATES PATENT OFFICE

MAURICE N. PRANGE, OF DETROIT, MICHIGAN, ASSIGNOR TO JESSE B. KINCAID, OF DETROIT, MICHIGAN

MEASURING DEVICE

Application filed September 28, 1925. Serial No. 59,132.

This invention relates to measuring devices and more particularly to a combination device for determining the size of a work piece and the hardness thereof.

The use heretofore, of machines designed for testing the hardness of metal, has required more or less skill and experience on the part of the operator or the use of microscopic instruments and it is therefore a particular object of this present invention to provide a device capable of measuring the hardness of metal and so designed as to render the same simple in operation and use.

Another object of the invention is to combine with a testing machine of the above described character, a machine for measuring the finished size of the work-piece, whereupon an economy in operation and manufacture is obtained.

The invention has also among its objects to simplify, render more efficient and improve generally devices of this character, and these as well as other objects, advantages, and novel details of construction will be made more apparent as this description proceeds, especially when considered in connection with the accompanying drawings wherein Fig. 1 is a view partly in side elevation and partly in vertical section of a machine constructed in accordance with this invention, with the parts thereof in the position in which they appear when measuring the size of a work-piece; and Fig. 2 is a similar view with the parts in the position in which they appear when measuring the hardness of the metal of the workpiece.

Referring now particularly to the drawings wherein like reference characters indicate like parts, it will be noted that the machine comprises a base 10 provided with a plurality of vertical posts or pillars 11, upon which there is supported, in spaced relation to the base, a supporting table or platform 12. Mounted centrally of the base 10 in an enlargement 13 thereof, is a work support 14 having a threaded shaft portion 15 extending downwardly through bushing 16 mounted within the enlargement 13. By means of a set screw 17 engaging in a longitudinal groove 18 the work support is made non-rotatable but is adjustable vertically by means of an adjusting nut 19 operable by hand wheel 20.

Mounted in a central solid portion 21 of the supporting table 12 is a work engaging means comprising a slidably mounted bolt or element 22 provided with a sleeve 23 arranged between it and the accommodating aperture in the solid portion 21 of the table 12. Element 22 is provided with an enlargement or head 24 and a spring 25 surrounds element 22 and bears on the one hand against table 12 and on the other against head 24 and normally urges the bolt or element 22 in an upward direction.

Slidably associated with element 22 and adjacent the lower end thereof is a second element or sleeve 26, which is capable of a limited movement relative to the element 22 by means of a construction comprising a pin 27 carried by sleeve 26 and extending through a transverse opening 28 of a somewhat larger diameter formed in element 22. The lower end of element 22 is formed with a spherical or ball shaped bearing point 29, and the lower end of sleeve 26 is formed with an aperture 30 through which this spherical point 29 may project to a limited degree.

Mounted upon the head 24 of element 22 is a measurement indicating device comprising essentially a post or support 31 upon which is mounted a plate-like bracket 32 supporting a tube 33. This tube is connected by means of a stuffing box 34 with a collapsible container 35 supported as at 36 on post 31 and also by means of a supporting post 37 also projecting upwardly from the head 24 of element 22. Collapsible container 35 is adapted to contain a fluid, and upon any displacement of the contents thereof to cause the rise and fall in the tube 33 of a column of liquid 38. Arranged on the bracket 32 adjacent tube 33 is a column of graduations 39 and columns of suitable indicia obtained from previous calibrations whereby from the position of the column of fluid with reference to these indicia may be determined the readings of the instrument. The height of the column of liquid 38 is dependent upon the relative movement of elements 22 and 26 dependent upon their engagement with work-piece A.

Slidably mounted within a central bore formed in element 22 is a rod 40 which bears on the one hand against a bearing button 41 formed on the collapsible container 35, and on the other hand against pin 27 carried by sleeve 26.

Upon any relative movement between elements 22 and 26 rod 40 will be axially displaced by reason of its engagement with pin 27 and will cause a corresponding displacement of the fluid contained in container 35, thus causing a movement of the column of fluid 38 so that a reading upon the measuring mechanism may be had.

Formed integrally with, or secured to supporting table 12 in any suitable manner is a bracket 42. Pivotally mounted as at 43 to this bracket is a lever 44, one end of which is pivoted as at 45, by means of a link 46, to the end of a cam lever 47, the latter connection being in the form of a pivotal connection 48. Cam lever 47 is pivotally mounted as at 49 to the upper end of bracket 42, the end of this lever being preferably bifurcated as indicated at 50, each bifurcation being formed with a cam portion 51 adapted for engagement with the head 24 of element 22. The end of lever 47 is bifurcated so as to straddle and clear the collapsible container 35 and its associated structure.

The other end of lever 44 is pivotally connected as at 52 with a link 53 which supports a weight 54. Also pivotally connected as at 55 to the lever 44, is a link 56 pivotally connected as at 57 to an arm 58 carried by a shaft 59 journaled in the supporting table 12. A handle 60 is also keyed to the shaft 59.

In Fig. 1 wherein the device is shown with parts in the position wherein a work-piece A is to be measured for size, handle 60 is in its upwardly extending and substantially vertical position in which the load of weight 54 is supported on shaft 59 through the intermediary of link 53, lever 44, link 56, and lever 58. The handle 60 is maintained in its upward position by suitable stops (not shown) on the table 12. In this position also lever 44 has been rocked about its pivot 43 moving the short end thereof downwardly and swinging the long end of cam lever 47 downwardly to disengage cam 51 from element 22. With the parts in this position element 22 is in its extreme upper position and element 26 is in position to be engaged by the work-piece A. As is customary the work-piece A is passed between the lower end of element 26 and the work support 14. If the instrument is set so that the normal reading of the indicating device is below the desired size or tolerance limit element 26 will, upon engagement with the work-piece A of the proper size, be moved upwardly relatively to element 22, and will through the medium of pin 27 and rod 40 displace the contents in collapsible container 35 and raise the column of liquid 38 in the tube 33. If the column rises to the point on the column of graduations 39 which indicates the proper size, the work-piece A may be removed and passed as correct.

In Fig. 2 handle 60 has been swung to a position wherein the load of weight 54 is no longer supported on shaft 59 but on the other hand forcibly urges lever 44 to swing downwardly about its pivot 43, which movement through the intermediary of link 46 tends to move cam lever 47 in a direction which brings cam 51 into operative engagement with the head 24 of element 22. This action forcibly displaces element 22 and urges the same, with a predetermined effort, dependent upon the size of weight 54, and the ratio of the levers, toward the work-piece A. The actual engagement between element 22 and work-piece A is through spherical bearing point 29. During this movement of element 22 sleeve or element 26 is not forcibly urged toward work-piece A and therefore rests on the surface thereof. Consequently any movement of element 22 axially toward work-piece A, with element 26 and consequently pin 27 at rest, results in a relative movement between element 22 and rod 40 and a displacement of the liquid in collapsible container 35. It should be understood that container 35 is carried by element 22 and moves downwardly therewith. This causes a displacement of the column of fluid 38 whereupon a reading may be had on the indicia 39. This reading will indicate the hardness of the work-piece A.

If desired an upright plate 61 may be secured in any suitable manner preferably by a bolt 62 to the table 12. This plate acts as a shield for the indicating mechanism and the upper end of element 22. Furthermore, posts 31 and 37 are threaded so that the collapsible container 35 and tube 33 may be properly positioned with reference to this element, a nut 63 being provided on the post 31 for adjusting bracket plate 32 and the indicia columns thereon with reference to tube 33.

It will be understood that the device will be at the outset accurately calibrated so that the position of the end of the column of liquid 38 with reference to the columns of indicia 39 will indicate, in one instance, the amount the work-piece is above or below proper size and in the second instance, the hardness of the metal as calculated from a standard work-piece, in the customary manner. In the latter instance, in calibrating the instrument, the force exerted by weight 54 through the system of levers on element 22 must be considered but inasmuch as this force is of a predetermined and constant value the calibration may be easily and accurately completed.

While the invention has been described and illustrated herein somewhat in detail it will be immediately apparent to those skilled in the art that various changes and modifications in the details of construction may be resorted to without departing from the spirit and scope of this invention and to this end reservation is made to make such changes as may come within the purview of the accompanying claims.

What I claim as my invention is:

1. In a measuring device, a supporting table and a work support located beneath said table, a work-engaging means including an element slidably mounted in said table, a second element sleeved upon the lower end of the element aforesaid and capable of limiting movement relative thereto upon engagement with the workpiece, indicating mechanism carried by the first mentioned element, and a rod slidably mounted in said first mentioned element, and displaceable by said second element for actuating said indicating mechanism.

2. In a device of the class described, a supporting table and a work support located beneath said table, a work-engaging means including an element slidably mounted in said table, a second element associated with the element aforesaid and capable of limited movement relative thereto upon engagement with the workpiece, indicating mechanism carried by the first mentioned element, and a member slidably mounted in said first mentioned element and displaceable by said second element for actuating said indicating mechanism.

3. In a hardness testing device, a movable work engaging element having an opening therein, a second element engageable with the work circumferentially of the work engaging element, an indicating mechanism, a member slidably mounted within the opening formed in said first mentioned element and engageable with the said indicating mechanism, and means carried by said second element and engageable with said member for actuating the same upon a relative movement of the said elements to operate the indicating mechanism.

4. In a hardness testing device, a supporting table and a work support, a work-engaging element slidably mounted in said table, indicating mechanism carried by said element, a second element adapted to engage the work-piece circumferentially of said work engaging element, and means operable by a relative movement between said first and second mentioned elements for operating said indicating mechanism.

5. In a hardness testing device, an indicating mechanism, a work engaging means including an element supporting said indicating mechanism, means for forcefully urging said element toward the work-piece, and a second element slidably engaging the element aforesaid and adapted to bear upon the work-piece circumferentially of said first mentioned element and means operable upon a relative movement of said elements for actuating said indicating mechanism.

6. In a hardness testing device, an indicating mechanism, a work engaging means including an element supporting said indicating mechanism, means for forcefully urging said element toward the work-piece to make a hardness depression therein, and a second element slidably engaging the element aforesaid and adapted to bear upon the work-piece circumferentially of said first mentioned element and means operable upon a relative movement of said elements for actuating said indicating mechanism to indicate the depth of said depression.

7. In a hardness testing device, a movable work engaging element, a second element engageable with the work circumferentially of the work engaging element, an indicating mechanism, a member slidably mounted by the first mentioned element and engageable with the said indicating mechanism, and means carried by said second mentioned element and engageable with said member for actuating the same upon a relative movement of the said elements to operate the indicating mechanism.

In testimony whereof I affix my signature.

MAURICE N. PRANGE.